US008060659B2

(12) United States Patent
Ichieda (10) Patent No.: US 8,060,659 B2
(45) Date of Patent: Nov. 15, 2011

(54) METHOD OF DETERMINING IMAGE TRANSMISSION METHOD, IMAGE SUPPLYING SYSTEM, IMAGE SUPPLYING DEVICE, IMAGE DISPLAY DEVICE, PROGRAM AND COMPUTER-READABLE RECORDING MEDIUM (75) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 832 days.

(21) Appl. No.: 12/075,216

(22) Filed: Mar. 10, 2008

(65) Prior Publication Data
US 2008/0226182 A1  Sep. 18, 2008

(30) Foreign Application Priority Data

Mar. 13, 2007 (JP) .................. 2007-063496
Feb. 12, 2008 (JP) .................. 2008-030809

(51) Int. Cl.
 *G06F 3/00* (2006.01)
 *G06F 13/38* (2006.01)
(52) U.S. Cl. ............. 710/5; 710/11; 710/16; 710/62; 345/1.1; 345/501; 709/203
(58) Field of Classification Search .............. None
See application file for complete search history.

(56) References Cited

U.S. PATENT DOCUMENTS

| | | | |
|---|---|---|---|
| 5,522,041 A | 5/1996 | Murakami et al. | |
| 5,611,038 A * | 3/1997 | Shaw et al. | 715/202 |
| 6,105,042 A | 8/2000 | Aganovic et al. | |
| 6,314,479 B1 | 11/2001 | Frederick et al. | |
| 6,414,664 B1 * | 7/2002 | Conover et al. | 345/89 |
| 6,738,421 B1 * | 5/2004 | Ueno | 375/240.01 |
| 6,766,407 B1 * | 7/2004 | Lisitsa et al. | 710/316 |
| 6,779,040 B1 * | 8/2004 | Lee et al. | 709/247 |
| 7,248,632 B1 * | 7/2007 | McKenzie et al. | 375/240.2 |
| 7,617,515 B1 * | 11/2009 | Laksono | 725/93 |
| 2003/0065716 A1 | 4/2003 | Kyusojin | |
| 2003/0110234 A1 * | 6/2003 | Egli et al. | 709/217 |
| 2003/0158979 A1 * | 8/2003 | Tateyama et al. | 710/33 |
| 2005/0024392 A1 * | 2/2005 | Lee | 345/698 |

(Continued)

FOREIGN PATENT DOCUMENTS

EP  1646227 A1  4/2006

(Continued)

OTHER PUBLICATIONS

Hitachi, Ltd. et al., High-Definition Multimedia Interface, Jun. 22, 2006.

(Continued)

*Primary Examiner* — Henry Tsai
*Assistant Examiner* — Michael Sun
(74) *Attorney, Agent, or Firm* — AdvantEdge Law Group, LLC (57) ABSTRACT

There is provided a method of determining an optimal image transmission method when image data is transmitted from an image supplying device 1 and 1' to an image display device 2 and 2', the method including: before the image data is transmitted after a transmission path from the image supplying device 1 and 1' to the image display device 2 and 2' is established, determining the image transmission method on the basis of correspondence table, which is previously prepared, such that the optimal image transmission method according to at least one of transmission path information and capability of the image display device 2 and 2' acquired by the image supplying device 1 and 1' is derived.

14 Claims, 8 Drawing Sheets

U.S. PATENT DOCUMENTS

| | | | |
|---|---|---|---|
| 2005/0223135 A1* | 10/2005 | Kotani | 710/22 |
| 2006/0026513 A1* | 2/2006 | Eschbach et al. | 715/526 |
| 2006/0143679 A1 | 6/2006 | Yamada et al. | |
| 2006/0192860 A1* | 8/2006 | Atsumi et al. | 348/222.1 |
| 2006/0222246 A1 | 10/2006 | Murai et al. | |
| 2009/0016263 A1* | 1/2009 | Kishigami et al. | 370/328 |

FOREIGN PATENT DOCUMENTS

| | | |
|---|---|---|
| JP | 6-014083 A | 1/1994 |
| JP | 06-326856 | 11/1994 |
| JP | 7-203177 A | 8/1995 |
| JP | 10-154116 | 6/1998 |
| JP | 2000-165435 | 6/2000 |
| JP | 2003-085086 | 3/2003 |
| JP | 2004-032553 A | 1/2004 |
| JP | 2004-187062 | 7/2004 |
| JP | 2007-264903 A | 10/2007 |

OTHER PUBLICATIONS

European Search Report, Apr. 4, 2011, issued in related Patent Application No. EP-08720377.

* cited by examiner

METHOD OF DETERMINING IMAGE TRANSMISSION METHOD, IMAGE SUPPLYING SYSTEM, IMAGE SUPPLYING DEVICE, IMAGE DISPLAY DEVICE, PROGRAM AND COMPUTER-READABLE RECORDING MEDIUM

TECHNICAL FIELD

The present invention relates a method of determining an image transmission method, an image supplying system, an image supplying device, an image display device, a program and a computer-readable recording medium.

This application claims the benefit of Japanese Patent Application No. 2007-63496, filed on Mar. 13, 2007 and Japanese Patent Application No. 2008-030809, filed on Feb. 12, 2008, which are hereby incorporated by reference as if fully set forth herein.

BACKGROUND ART

Conventionally, if an image display device is connected to an image supplying device, the image supplying device is generally adapted to processing capability such as a compression method supported by the image display device.

As the adapting method, a system and method for exchanging computer data processing capability between a computer related to the image display device and the like and a computer related to the image supplying device and the like is known (for example, see Patent Document 1).

That is, it is possible to communicate information about the data processing capability between the computers.

In more detail, the computers exchange the capability such that data transmission between the computers can be performed with a most efficient data format with respect to the two computers.

A first computer which receives a data file sends a data processing capability list to a second computer which transmits the data file to the first computer.

The transmission computer checks the capability and determines the most efficient data format for transmission, similar to the capability list of the reception computer.

The transmission computer can process the data file with an intermediate format, for efficient data transmission which allows the reception computer to process the intermediate data file with a desired data format.

Meanwhile, in an OSI communication method, in a case where plural pieces of data having different coding methods are transmitted, a technology of the OSI communication capable of improving the convenience of the communication in addition to simple communication control is known (for example, see Patent Document 2).

In more detail, if a session connection is established, information about image data which will be transmitted, that is, CAPABILITY DATA SPDU including information about document image data and still image data, is transmitted.

A called terminal includes its capability information, which can be communicated, in the CAPABILITY DATA ACK SPDU and responds thereto.

A calling terminal receives the capability information, checks that a counterpart can be communicated, transmits ACTIVITY START SPDU, sequentially transmits the document image data and the still image data, and transmits ACTIVITY ENDS PDU.

[Patent Document 1] JP-A-7-203177
[Patent Document 2] JP-A-6-14083

DISCLOSURE OF THE INVENTION

Problems that the Invention is to Solve

However, the technologies of Patent Documents 1 and 2 relate to the image supplying device for determining an image transmission method on the basis of the capability of the image display device or transmission path information, but may not obtain sufficient performance even when the image supplying device is connected to different image display devices.

In particular, in the case where the different image display devices are connected to a specific image supplying device, if the image supplying device is specialized to be adapted to only any image display device, it is impossible to obtain sufficient performance when the image supplying device is connected to the different image display devices.

In addition, the performance described herein indicates "speed=(consumed time$^{-1}$)" deployed in a video memory (VRAM) of the image display device by transmitting image data from the image supplying device. As the speed is high, the performance is good.

As one of the cause for deteriorating the performance, there are different compression methods due to soft decode and hard decode, etc. supported by the image supplying device and the image display device.

If panel sizes are different by the image display device, a method of previously completing a scaling process at the image supplying device so as to reduce the amount of data and passing the data through a transmission path is preferable compared with a method of performing scaling process with respect to image data, which is received through a transmission path from the image supplying device, at the image display device and deploying the data in the video memory.

In the case where the scaling process is executed by the image supplying device, a time necessary for the scaling process is shorter than that of the case where the scaling process is executed by the image display device. Accordingly, the performance may become good and thus there is room for improvement.

The present invention is contrived to solve the above-described problems. An object of the present invention is to provide a method of determining an image transmission method, which is capable of obtaining sufficient performance even when being connected to different image display devices, by allowing an image supplying device to acquire and adapt to the capability of the connected image display device when the image supplying device is connected to the image display device by exchange or when the image supplying device is connected to the image display device by switching, and an image supplying system.

Another object of the present invention is to adapt to transmission path information and reduce a time necessary for a scaling process.

Means for Solving the Problems

In order to accomplish the objects, there is provided a method of determining an optimal image transmission method when image data is transmitted from an image supplying device to an image display device, the method including: before the image data is transmitted after a transmission path from the image supplying device to the image display device is established, determining the image transmission method on the basis of correspondence table, which is previously prepared, such that the optimal image transmission method according to at least one of transmission path information and capability of the image display device acquired by the image supplying device is derived.

The method according to the present invention may include a capability request step of transmitting a capability request command from the image supplying device to the image display device; a capability request command response step of transmitting capability information from the image display device to the image supplying device according to the capability request command; an image transmission method determining step of determining the image transmission method; a connection request step of transmitting the connection request command from the image supplying device to the image display device; an image configuration data transmission step of transmitting data, which can define at least resolution or a pixel format, from the image supplying device to the image display device as image configuration data of an image to be transmitted; a state inquiry step of transmitting a state inquiry command from the image supplying device to the image display device; a state inquiry command response step of responding to the state inquiry command; and an image data transmission step of transmitting the image data from the image supplying device to the image display device by the method determined by the image transmission method determining step.

In the method according to the present invention, the image transmission method determining step may include a scaling determining step of determining by which of the image supplying device and the image display device scaling for decreasing the data amount of the image data by reducing the image is executed; and a compression method determining step of determining a compression method of the image data in a selectable range.

In the method according to the present invention, if the image configuration data is included in the connection request command, the image configuration data transmission may be executed in the same sequence.

In the method according to the present invention, in the capability request command, among capability IDs which are determined in each of contents of the capability, the image supplying device may request only a capability ID related to a valid capability acquired by the image supplying device to the image display device.

The method according to the present invention may include a capability request step of transmitting a capability request command from the image supplying device to the image display device; a capability request command response step of transmitting capability information from the image display device to the image supplying device according to the capability request command; a communication speed measurement data transmission step of transmitting communication speed measurement data from the image supplying device to the image display device; an image transmission method determining step of measuring a communication speed on the basis of the communication speed measurement data and determining an optimal transmission method of image data; a connection request step of transmitting the connection request command from the image supplying device to the image display device; a state inquiry step of transmitting a state inquiry command from the image supplying device to the image display device; a state inquiry command response step of responding to the state inquiry command; and an image data transmission step of transmitting the image data from the image supplying device to the image display device by the method determined by the image transmission method determining step.

According to the present invention, there is provided an image supplying system for supplying image data from an image supplying device to an image display device through a transmission path, wherein: the image supplying device includes: a capability request unit which transmits a capability request command to the image display device; an image transmission method determination unit which determines an optimal transmission method of the image data on the basis of at least one of transmission path information and capability information obtained from the image display device; a connection request unit which transmits a connection request command to the image display device; an image configuration data transmission unit which transmits image configuration data, which can define at least resolution or a pixel format, to the image display device as image configuration data of an image to be transmitted; a state inquiry unit which transmits a state inquiry command to the image display device; and an image data transmission unit which transmits the image data from the image supplying device to the image display device by the method based on the determination of the image transmission method determination unit, and the image display device includes: a capability information provision unit which provides capability information according to the capability request command; and a state inquiry command response unit which responds to the state inquiry command.

According to the present invention, there is provided an image supplying system for supplying image data from an image supplying device to an image display device through a transmission path, wherein: the image supplying device includes: a capability request unit which transmits a capability request command to the image display device; a communication speed measurement data transmission unit which transmits communication speed measurement data to the image display device; an image transmission method determination unit which determines an optimal transmission method of the image data on the basis of the communication speed measured based on at least one of the communication speed measurement data and capability information obtained from the image display device; a connection request unit which transmits a connection request command to the image display device; a state inquiry unit which transmits a state inquiry command to the image display device; and an image data transmission unit which transmits the image data from the image supplying device to the image display device by the method based on the determination of the image transmission method determination unit, and the image display device includes: a capability information provision unit which provides capability information according to the capability request command; and a state inquiry command response unit which responds to the state inquiry command.

According to the present invention, there is provided an image supplying device for supplying image data to an image display device through a transmission path, the device including: a capability request unit which transmits a capability request command to the image display device; an image transmission method determination unit which determines a transmission method of the image data on the basis of at least one of transmission path information and capability information obtained from the image display device; a connection request unit which transmits a connection request command to the image display device; an image configuration data transmission unit which transmits image configuration data, which can define at least resolution or a pixel format, to the image display device as image configuration data of an image to be transmitted; a state inquiry unit which transmits a state inquiry command to the image display device; and an image data transmission unit which transmits the image data from the image supplying device to the image display device by the method based on the determination of the image transmission method determination unit.

According to the present invention, there is provided an image supplying device for supplying image data to an image display device through a transmission path, the device including: a capability request unit which transmits a capability request command to the image display device; a communication speed measurement data transmission unit which transmits communication speed measurement data to the image display device; an image transmission method determination unit which determines an optimal transmission method of the image data on the basis of the communication speed measured based on at least one of the communication speed measurement data and capability information obtained from the image display device; a connection request unit which transmits a connection request command to the image display device; a state inquiry unit which transmits a state inquiry command to the image display device; and an image data transmission unit which transmits the image data from the image supplying device to the image display device by the method based on the determination of the image transmission method determination unit.

According to the present invention, there is provided an image display device for receiving image data from an image supplying device through a transmission path, the device including: a capability information provision unit which provides capability information according to a capability request command received from the image supplying device; and a state inquiry command response unit which responds to a state inquiry command received from the image supplying device.

The image display device according to the present invention is a projector.

According to the present invention, there is provided a program including: a capability request step of transmitting a capability request command from an image supplying device to an image display device; a capability request command response step of transmitting capability information from the image display device to the image supplying device according to the capability request command; an image transmission method determining step of determining the image transmission method; a connection request step of transmitting connection request command from the image supplying device to the image display device; an image configuration data transmission step of transmitting data, which can define at least resolution or a pixel format, from the image supplying device to the image display device as image configuration data of an image to be transmitted; a state inquiry step of transmitting a state inquiry command from the image supplying device to the image display device; a state inquiry command response step of responding to the state inquiry command; and an image data transmission step of transmitting the image data from the image supplying device to the image display device by the method determined by the image transmission method determining step.

According to the present invention, there is provided a program including: a capability request step of transmitting a capability request command from an image supplying device to an image display device; a capability request command response step of transmitting capability information from the image display device to the image supplying device according to the capability request command; a communication speed measurement data transmission step of transmitting communication speed measurement data from the image supplying device to the image display device; an image transmission method determining step of measuring a communication speed on the basis of the communication speed measurement data and determining an optimal transmission method of image data; a connection request step of transmitting the connection request command from the image supplying device to the image display device; a state inquiry step of transmitting a state inquiry command from the image supplying device to the image display device; a state inquiry command response step of responding to the state inquiry command; and an image data transmission step of transmitting the image data from the image supplying device to the image display device by the method determined by the image transmission method determining step.

According to the present invention, there is provided a computer-readable recording medium for storing the program.

Advantage of the Invention

According to the image supplying system of the present invention, by determining the transmission method of the image data on the basis of at least one of the transmission path information and the capability information of the image display device from the image supplying device, it is possible to obtain sufficient performance in each of image display devices even when being connected to different image display devices.

DESCRIPTION OF THE REFERENCE NUMERALS AND SIGNS 1, 1', 1A: image supplying device
2, 2', 2A: image display device
11: interface
E: image supplying system

BEST MODE FOR CARRYING OUT THE INVENTION

Hereinafter, a method of determining an image transmission method according to embodiments of the present invention will be described with reference to the accompanying drawings.

In the drawings, the same function and the same sequence are denoted by same reference numerals in order to avoid duplication of description.

First Embodiment

First, a first embodiment of the present invention will be described with reference to FIGS. 1 to 4.

Figure 1:
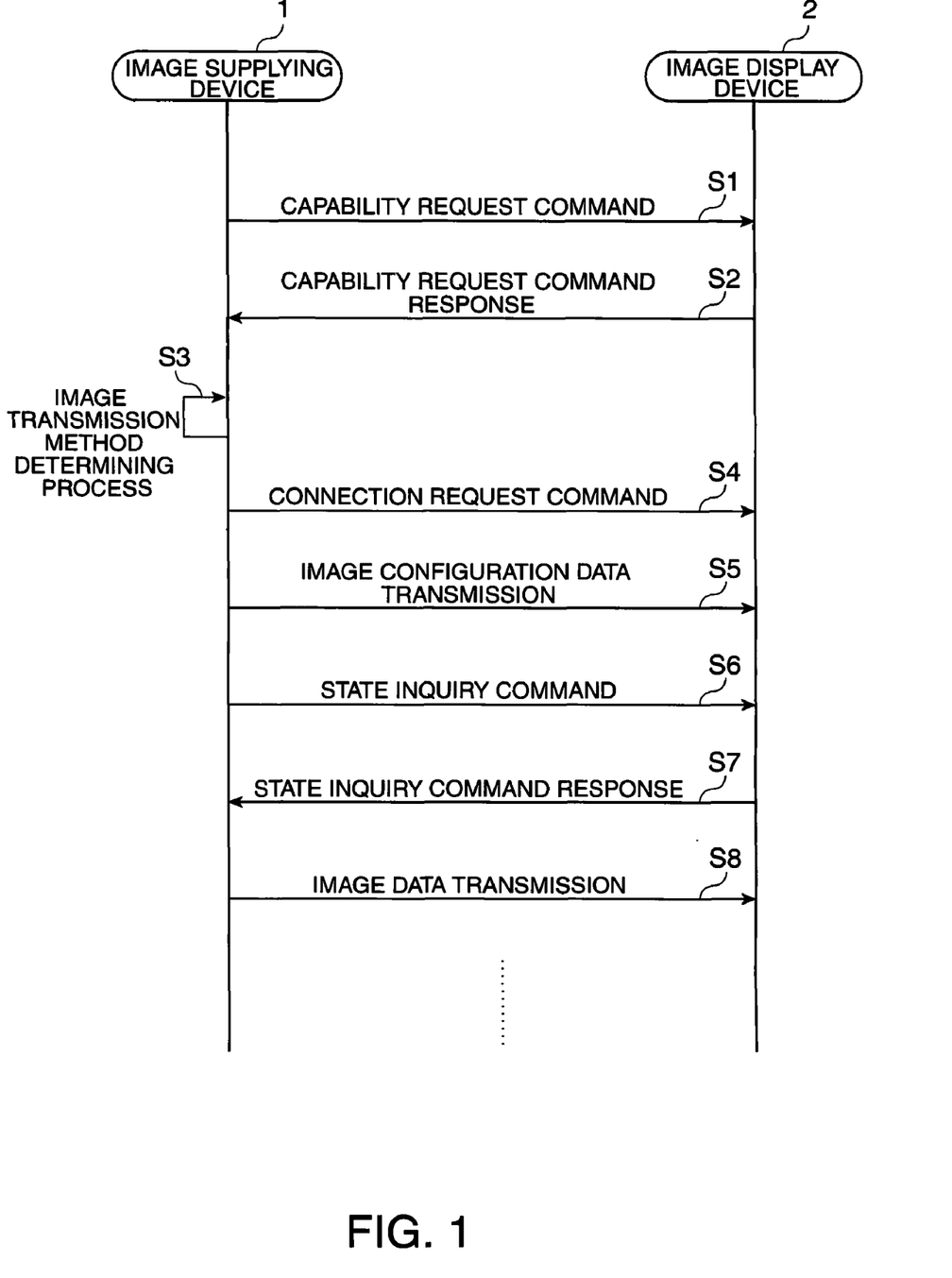
FIG. 1 is a sequence view showing a method of determining an image transmission method according to a first embodiment of the present invention.

FIG. 1 is a sequence view showing a method of determining an image transmission method according to a first embodiment of the present invention.

As shown in FIG. 1, an image supplying device 1 executes various types of processes, which will be described later, on the basis of a predetermined program. After a communication path (transmission path) is established between the image supplying device 1 and an image display device 2, an image transmission method is determined by a sequence defined by the present determining method, in order to check the state of the image display device 2.

First, if image data can be transmitted, the image supplying device 1 executes a capability request command (step S1) for transmitting a capability request command to the image display device 2.

In order to respond thereto, the image display device 2 executes a capability request command response (step S2) for returning capability information.

Figure 2:
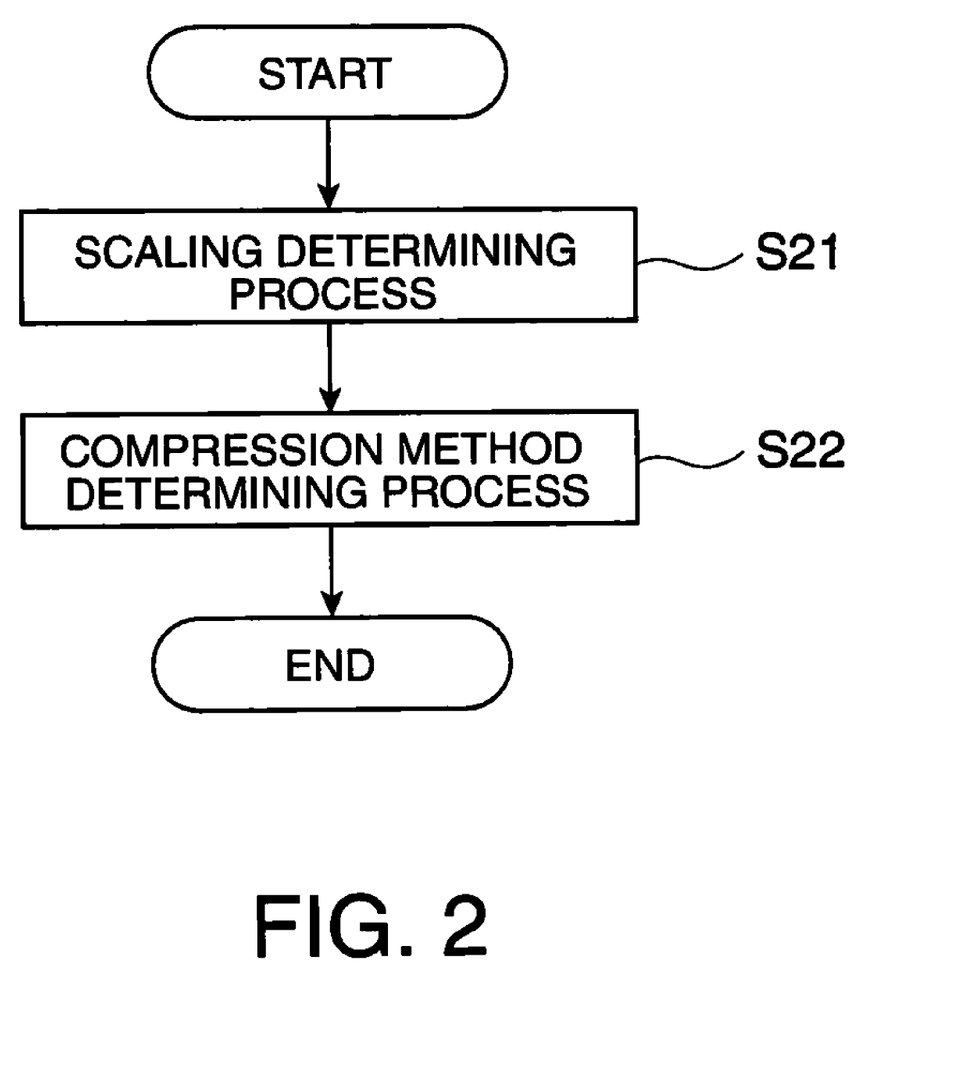
FIG. 2 is a flowchart showing the contents of a process of determining the transmission method of the image transmission method according to the first embodiment.

Next, after a process of determining the image transmission method (step S3) which will be described later with reference to FIG. 2 is executed, a connection request command (step S4) for transmitting a connection request command to the image display device 2 is executed.

Then, image configuration data transmission (step S5) for transmitting resolution and a pixel format, etc. for defining the configuration of an image which is transmitted from now from the image supplying device 1 to the image display device 2 is executed.

Here, image configuration data transmission (step S5) may be included in the connection request command (step S4)

That is, if image configuration data for the image to be transmitted is included in the connection request command (step S4), the image configuration data transmission (step S5) is executed in the same sequence as the connection request command (step S4), but these sequences may be equal to each other or may be different from each other.

Since a capability ID is generally determined in each of panel resolution, supported maximum resolution or supported compression method, in the capability request command (step S1), only capability which is necessary and efficient in the image supplying device 1 may be efficiently requested.

In contrast, regardless of the necessity in the image supplying device 1, in the capability request command response (step S2), the image supplying device 1 may receive every capability information without selection from the image display device 2.

Then, a state inquiry command (step S6) for transmitting a state inquiry command and a state inquiry command response (step S7) for responding thereto are executed.

Thereafter, the image supplying device 1 executes image data transmission (step S8) for transmitting image data to the image display device 2 by the image transmission method based on the process of determining the image transmission method (step S3).

The image transmission method is determined by the method including these sequences.

The contents of the capability are as follows.

The capability is capability specification of the image display device 2 and a restriction condition in use can be clarified by knowing the capability.

In more detail, this is as follows.

Projector ID
CPU clock
Panel resolution
Supported maximum resolution
Supported minimum resolution
Requested compression method
Supported compression method Hereinafter, hardware is abbreviated to HW and software is abbreviated to SW.

RAWRGB565/RGB888 (HW decode/SW decode/non-correspondence)
JPEG (HW decode/SW decode/non-correspondence)
ZLIB (HW decode/SW decode/non-correspondence)
Scaling process (HW process/SW process/non-correspondence)
Pixel row inversion function (HW process/SW process/non-correspondence)
Transmittable minimum rectangle size (width and height)
Alignment size (byte boundary with respect to pixel)

FIG. 2 is a flowchart showing the contents of the process of determining the transmission method (step S3) according to the first embodiment.

As shown in FIG. 2, in the process of determining the transmission method (step S3), two processes including a scaling determining process (step S21) and a compression method determining process (step S22) are executed.

In the scaling determining process (step S21), on the basis of the capability for at least one of the panel resolution, the supported maximum resolution, the supported minimum resolution and the scaling, it is determined by which of the image supplying device 1 or the image display device 2 the scaling is processed.

That is, the determination is reasonably made on the basis of the resolution of the image supplying device 1, the resolution requested by the image display device 2, and the scaling processing capabilities of the image supplying device 1 and the image display device 2.

For example, if the resolution of the image supplying device 1 is smaller than the resolution requested by the image display device 2, the image data may be transmitted from the image supplying device 1 to the image display device 2 with the original resolution without executing the scaling process.

In the compression method determining process (step S22), on the basis of the capability for the CPU clock and the supported compression method, the deployment processing capability in the image display device 2 is determined and the method of compressing the image data is selected by the image supplying device 1.

When the compression method is determined, the determination may be made by adding the transmission path information.

In more detail, a selection range of the compression method narrows by deciding the transmission path information such as LAN/wireless LAN/USB 2.0/USB 1.1.

Alternatively, since the decision may be unambiguously made on the basis of the transmission path information, the determination of the compression method can be set in a correspondence table.

For example, in USB 1.1, since a transmission band is small, it is preferable that JPEG which is a high compression method is defined to be first selected in the correspondence table.

Figure 3A:
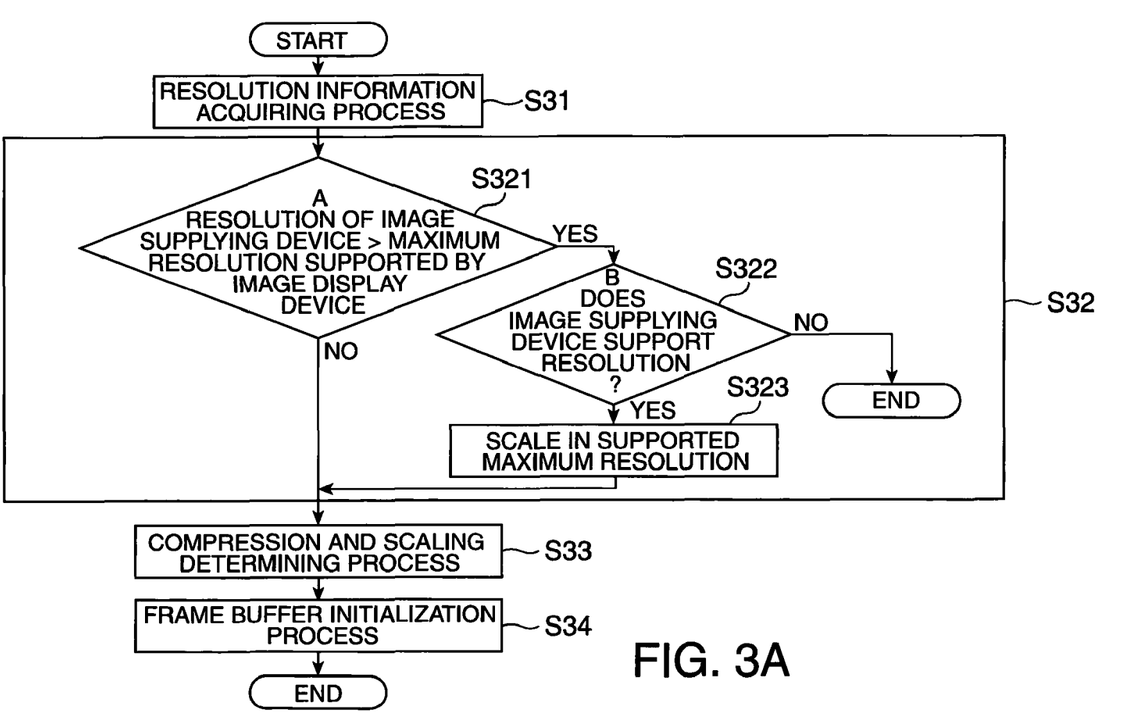
FIG. 3A is a flowchart showing in detail the contents of the process of determining the image transmission method according to the first embodiment.
Figure 3B:
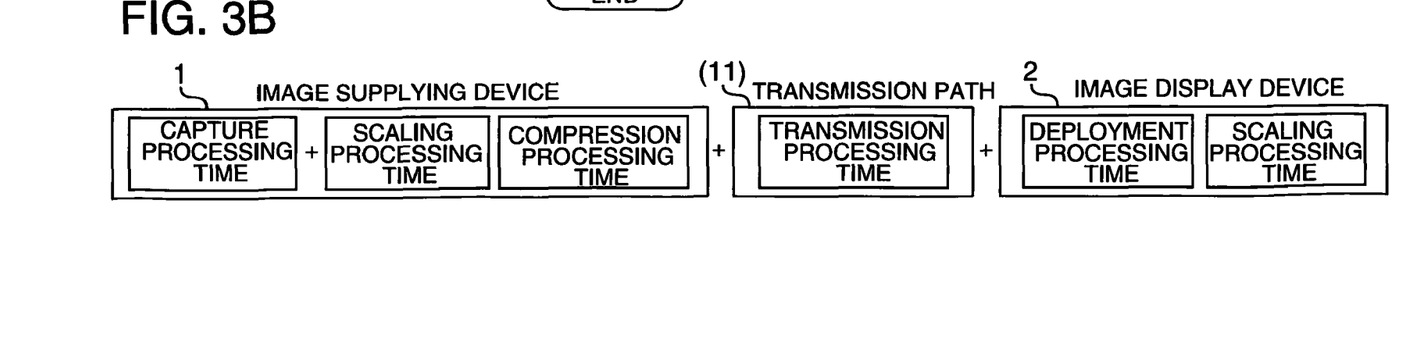
FIG. 3B is a view showing a computation equation used in the determining process showing in detail the contents of the process of determining the image transmission method according to the first embodiment.

FIGS. 3A and 3B are views showing in detail the contents of the process of determining the transmission method of the image transmission method according to the first embodiment, wherein FIG. 3A is a flowchart and FIG. 3B is a computation equation used in the determining process.

FIG. 3A shows the flowchart of FIG. 2 in detail.

First, a resolution information acquiring process (step S31) of acquiring resolution information of the image supplying device is executed. Thereafter, a resolution determining process (step S32) which is a process when the image supplying device 1 determines the supported resolution is executed and then a compression and scaling determining process (step S33) including both the compression method determining process (S22) and the scaling determining process (S21) is executed.

Next, a frame buffer initialization process is executed (step S34).

In the resolution determining process (step S32), a process including two determinations A and B is executed.

In a first determination A (step S321), it is determined whether (the resolution of the image supplying device 1)>(the maximum resolution which can be supported by the image display device 2) (it is determined whether the resolution of the image supplying device 1 is larger than the maximum resolution which can be supported by the image display device 2). That is, it is checked whether the resolution of the image supplying device 1 is in a range of the resolution which can be received by the image display device 2.

The process including the determination A is the check using the viewpoint of "the supported maximum resolution in the capability".

Here, if the resolution is in the range which can be received, that is, if the determined result is "Yes", the process progresses to a step S322 and the process including the below-described determination B is executed.

Meanwhile, in the determination A (step S321), if the determined result is "No" and the resolution of the image supplying device 1 can be supported by the image display device 2, the process progresses to the compression and scaling determining process (step S33).

Meanwhile, if the determination A (step S321) is "Yes" and the resolution of the image supplying device 1 exceeds an upper limit which can be supported by the image display device 2, it is determined whether the resolution is supported by the image supplying device 1, as a second determination B (step S322).

If the determination B (step S322) is "No", the process is finished.

In contrast, if the determination B (step S322) is "Yes", the process progresses to the compression and scaling determining process (step S33).

That is, if the resolution of the image supplying device 1 exceeds the upper limit which can be supported by the image display device 2 and the image supplying device 1 supports "the supported maximum resolution in the capability", the scaling is performed within the supported range.

A method having a smallest processing time is determined by the computation equation used in the determining process shown in FIG. 3B.

The scaling processing time uses any one of the image supplying device 1 or the image display device 2.

At this time, it is determined at which of the devices scaling is performed according to the panel resolution.

The image display device 2 maintains the processing capability of the deployment process and the scaling process as an average data amount KB/sec, as the capability.

Meanwhile, the image supplying device 1 measures the capabilities of a capture process, a scaling process and a compression process in advance after start-up.

Here, the method of measuring the transmission process capability is as follows.

(1) The transmission time when the capability information is acquired is measured.

(2) After the capability is acquired, test data is sent and measured.

(3) Information about the device which is connected is acquired, USB 2.0/USB 1.1 is determined, and the value of the transmission speed is derived from the table.

The image supplying device 1 initializes the frame buffer transmitted to the image display device 2 after the compression and scaling determining process (step S33).

Here, when the scaling is performed according to the panel resolution at the image supplying device 1, the resolution of the frame buffer is equal to the panel size resolution.

Figure 4:
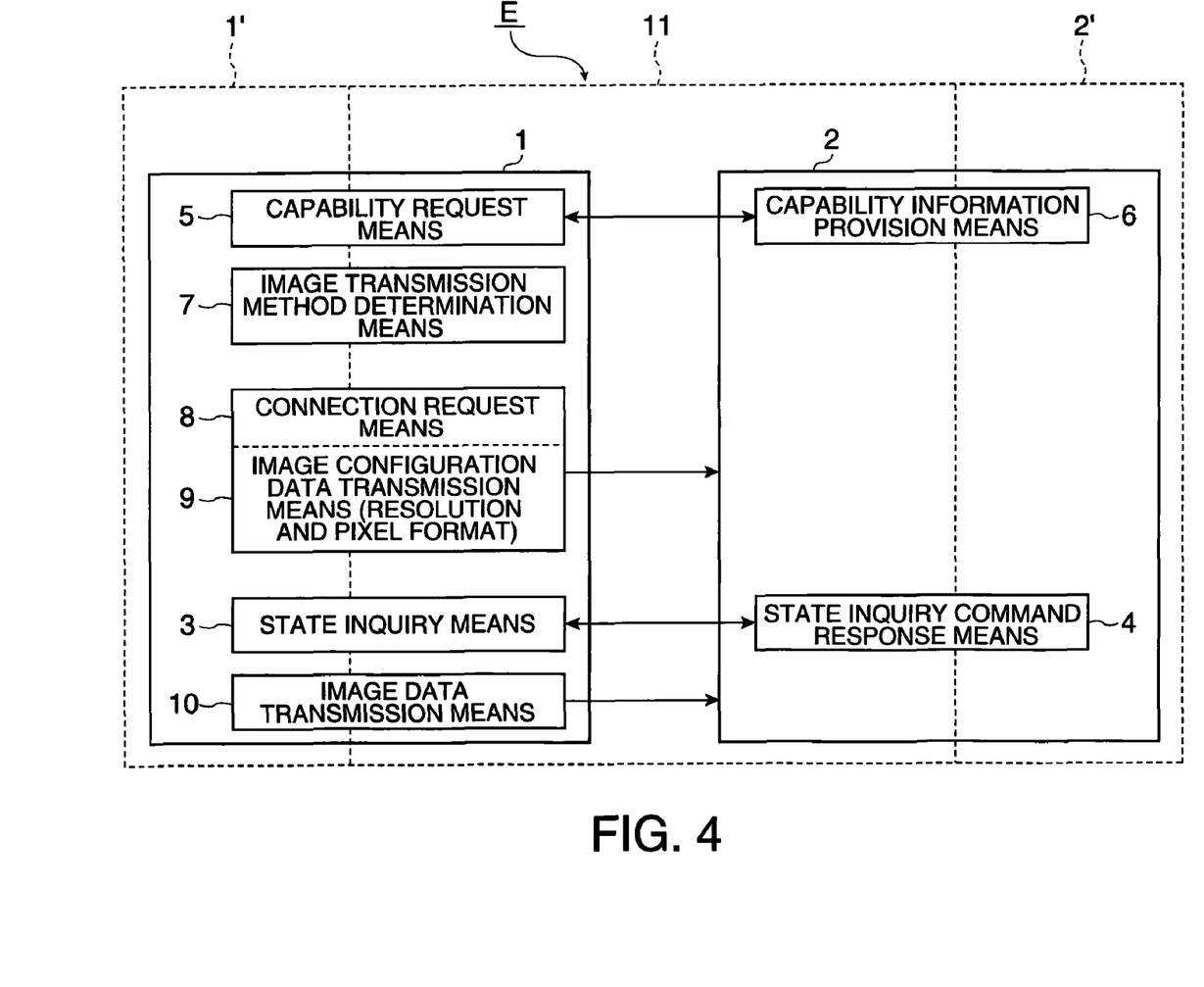
FIG. 4 is a block diagram showing the functional configuration of an image supplying system according to the first embodiment.

The image supplying device 1 in the image supplying system E transmits updated rectangle data from the frame buffer to the image display device 2.

At this time, the case where the rectangle data which can be received by the image display device 2 is restricted may be considered.

The capability for avoiding the restriction is also maintained in the image supplying device 1 and is based on the following definition.

(1) Pixel Alignment (Width and Height of Rectangle)

The rectangle data is acquired so as to become a multiple of this pixel alignment.

(2) Coordinate Position Alignment (Width and Height)

The rectangle data is acquired from a coordinate which becomes a multiple of this coordinate position.

(3) Minimum Rectangle Size

A minimum rectangle size which can be transmitted to the image display device is defined.

At the time of acquiring the rectangle data, the rectangle data is extracted from the frame buffer in consideration of the restriction of the alignment and the like.

The main constituent for executing the method of determining the image transmission method according to the first embodiment is a computer which is mounted in any one or both of the image supplying device 1 and the image display device 2.

Software (program) included in this computer is executed by the hardware (hardware such as storage, calculation, input/output, display, and communication) such that the steps S1 to S8 and S21 to S22 are executed.

The main constituent of these operations is the entire computer, but, for convenience of description, it may be considered that the functional components are separate from one another.

That is, the collective entity of the functional components for executing the steps S1 to S8 and S21 to S22 is the computer.

The image supplying system according to the present invention is configured by a combination of the image supplying device 1 and the image display device 2 and may be an image supplying system including the following elements in any one or both of the image supplying device 1 and the image display device 2.

FIG. 4 is a block diagram showing the functional configuration of the image supplying system E according to the first embodiment.

As shown in FIG. 4, the image supplying system E includes the image supplying device 1, the image display device 2, and an information transmission supporting unit and the like included in at least one of the image supplying device 1 and the image display device 2.

In addition, if a rate of the information transmission supporting unit included in an interface 11 is large, a sharing rate of the information transmission supporting unit included in an image supplying device 1' and an image display device 2' may be small.

In addition, the transmission path is included in the interface 11.

The information transmission supporting unit includes a capability request unit 5 for transmitting the capability request command from the image supplying devices 1 and 1' to the image display devices 2 and 2', a capability information provision unit 6 for providing the capability information according to the capability request command, an image transmission method determination unit 7 for determining the transmission method of the image data on the basis of at least one of the capability information and the transmission path information, a connection request unit 8 for transmitting the connection request command from the image supplying devices 1 and 1' to the image display devices 2 and 2', an image configuration data transmission unit 9 for transmitting the image configuration data, which can define at least the resolution or the pixel format, from the image supplying devices 1 and 1' to the image display devices 2 and 2' as the image configuration data of the image to be transmitted, a state inquiry unit 3 for transmitting the state inquiry command from the image supplying devices 1 and 1' to the image display devices 2 and 2', a state inquiry command response unit 4 for responding to the state inquiry command, and an image data transmission unit 10 for transmitting the image data from the image supplying devices 1 and 1' to the image display devices 2 and 2' using the method based on the determination of the image transmission method determination unit 7.

The image configuration data transmission unit 9 may be included in the connection request unit 8.

In contrast, if the connection request command and the image configuration data are transmitted in another session, the image configuration data transmission (step S5) is executed between the connection request command (step S4) and the state inquiry command (step S6).

According to the image supplying system E, by determining the transmission method of the image data on the basis of at least one of the transmission information and the capability information of the image display devices 2 and 2' from the image supplying devices 1 and 1', the image supplying devices 1 and 1' are adapted to the different image display devices even when the image supplying devices 1 and 1' are connected to the different image display devices. Thus, it is possible to obtain sufficient performance.

The image display device 2 is preferably a projector in at least one of the method of determining the image transmission method and the image supplying system according to the present invention.

For example, when the projector is connected to a personal computer configuring a portion of the image supplying system, it is possible to maintain high performance although an old projector or a new projector is connected exchangeably.

The technology of at least one of the method of determining the image transmission method and the image supplying system according to the present invention is applied to software included in a projector using a device such as a digital micromirror device (DMD) (registered trademark of Texas Instruments Incorporated).

Second Embodiment

Next, a second embodiment of the present invention will be described with reference to FIGS. 5 to 7.

Figure 5:
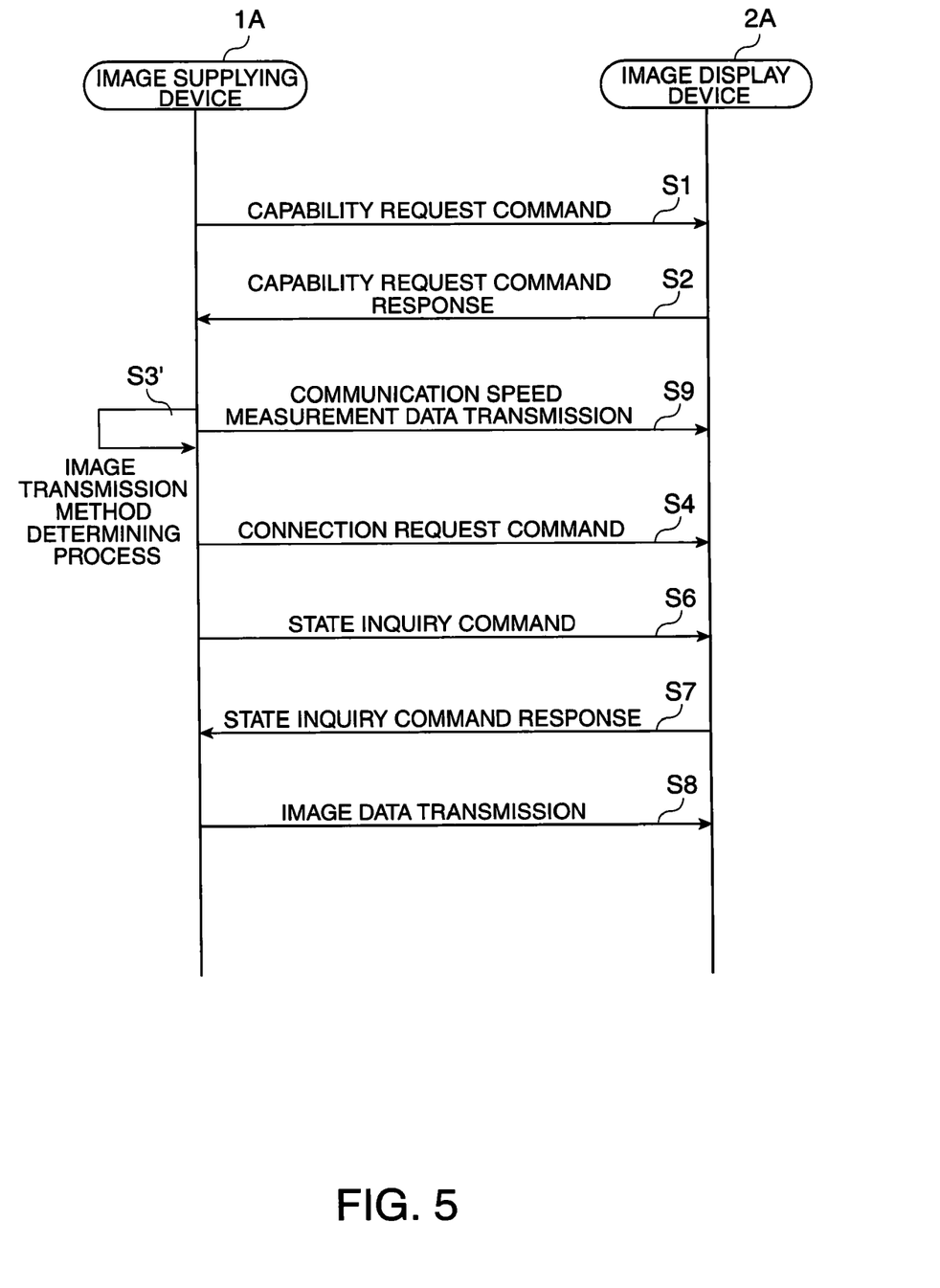
FIG. 5 is a sequence view showing a method of determining an image transmission method according to a second embodiment of the present invention.

FIG. 5 is a sequence view showing a method of determining an image transmission method according to a second embodiment of the present invention. FIGS. 6 and 7 are flowcharts showing the contents of a process of determining the image transmission method according to the second embodiment. FIGS. 8A and 8B are schematic views showing various types of processes according to the second embodiment.

The configuration of the system according to the second embodiment includes an image supplying device 1 including a communication speed measurement data transmission unit 12 instead of the image configuration data transmission unit 9 according to the first embodiment, and an image display device 2A for storing the same transmission path 11 as the first embodiment and the capability having the following contents.

First, although the capability of the second embodiment is described, it is assumed that, in the second embodiment, the five following items are set as the contents of the capability, unlike the first embodiment.

In the second embodiment, the image transmission method is determined in the sequence shown in FIG. 5, on the assumption of the capability.

In FIG. 5, the same processes as the processes shown in FIG. 1 are denoted by the same reference numerals.

(1) Panel Resolution
Width and height
(2) Supported Maximum Resolution
Width and height
(3) Color Space
Example: RGB565/RGB888/YUV or the like
(4) Supported Rectangle Compression Method
Compression format
Alignment of X, Y coordinate
Alignment of width and height
Width of minimum rectangle and height of minimum rectangle
Width of maximum rectangle and height of maximum rectangle
Processing speed (KB/sec)
(5) Scaling Processing Speed (Kb/Sec)

As can be readily seen from the comparison between FIG. 5 and FIG. 1, the method of determining the image transmission method according to the second embodiment is different from the determining method shown in FIG. 1 in the following (a) to (c).

(a) Contents of the image transmission method determining process (step S3')

(b) When the image supplying device 1A receives the response for the capability request command from the image display device 2A, the communication speed measurement data transmission (step S9) is executed before the process of transmitting the connection request command (step S4).

(c) The image configuration data transmission (step S5) is not performed between the process of transmitting the connection request command (step S4) and the process of transmitting the state inquiry command (step S6).

The communication speed measurement data transmission (step S9) is the process of transmitting the communication speed measurement data, which is configured such that the image display device 2A can measure the communication speed of the transmission path 11 which varies according to a traffic state, to the image display device 2A.

The image display device 2A receives the communication speed measurement data from the image supplying device 1A and measures the communication speed of the transmission path 11.

Figure 6:
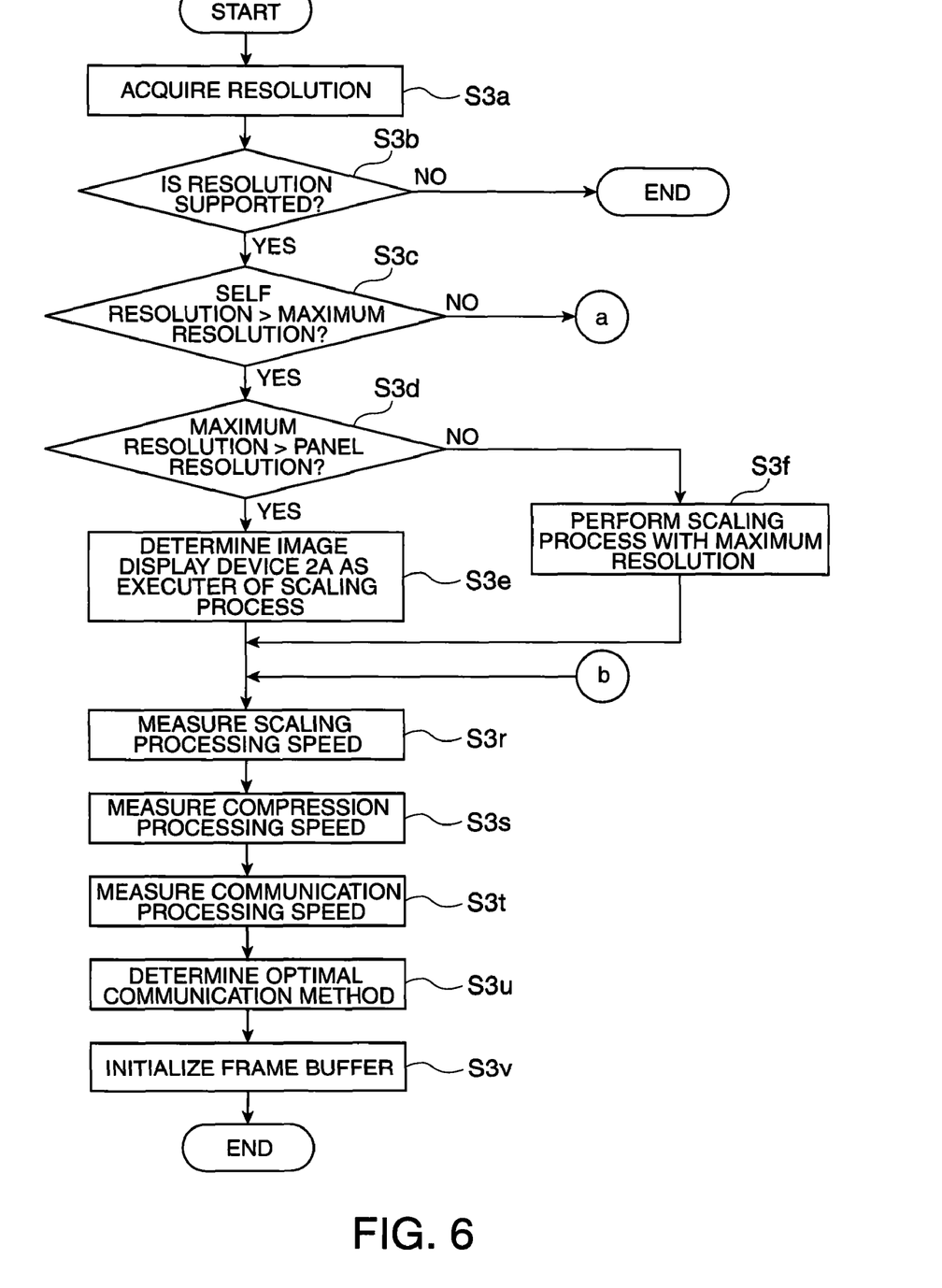
FIG. 6 is a first flowchart showing the contents of a process of determining the image transmission method according to the second embodiment.
Figure 7:
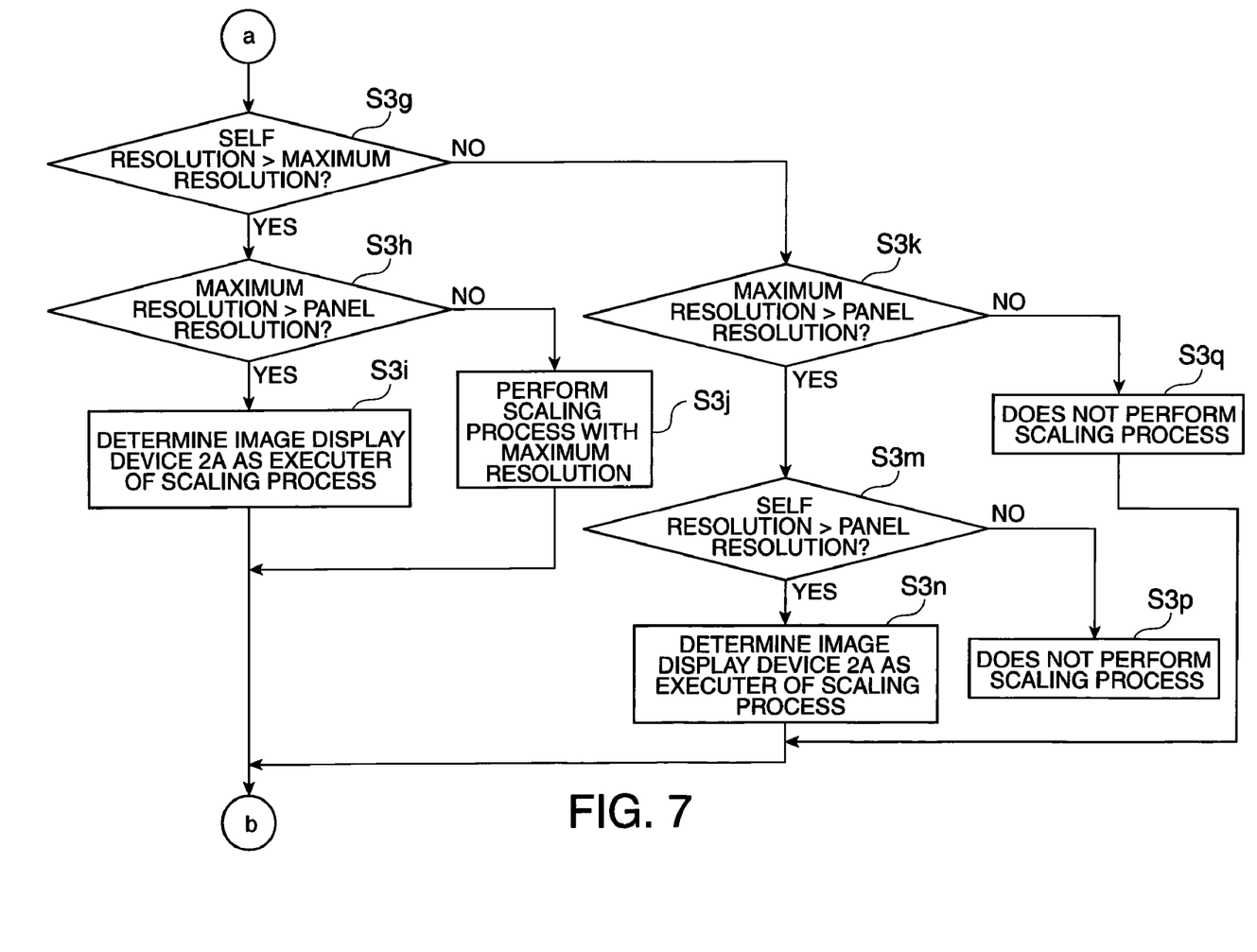
FIG. 7 is a second flowchart showing the contents of a process of determining the image transmission method according to the second embodiment.
Figure 8A:
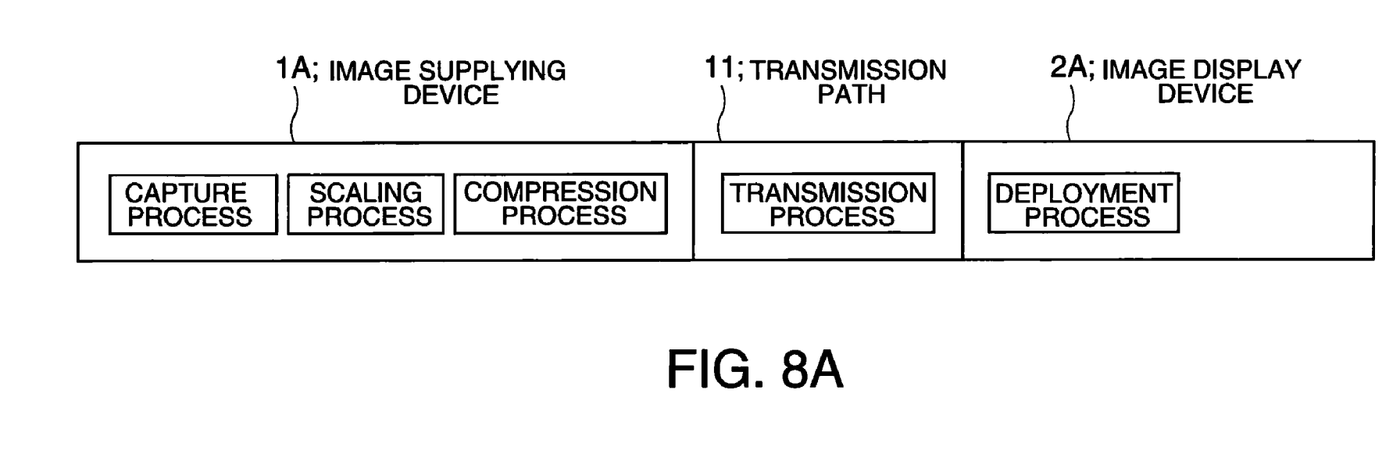
FIG. 8A is a schematic view showing various types of processes according to the second embodiment.
Figure 8B:
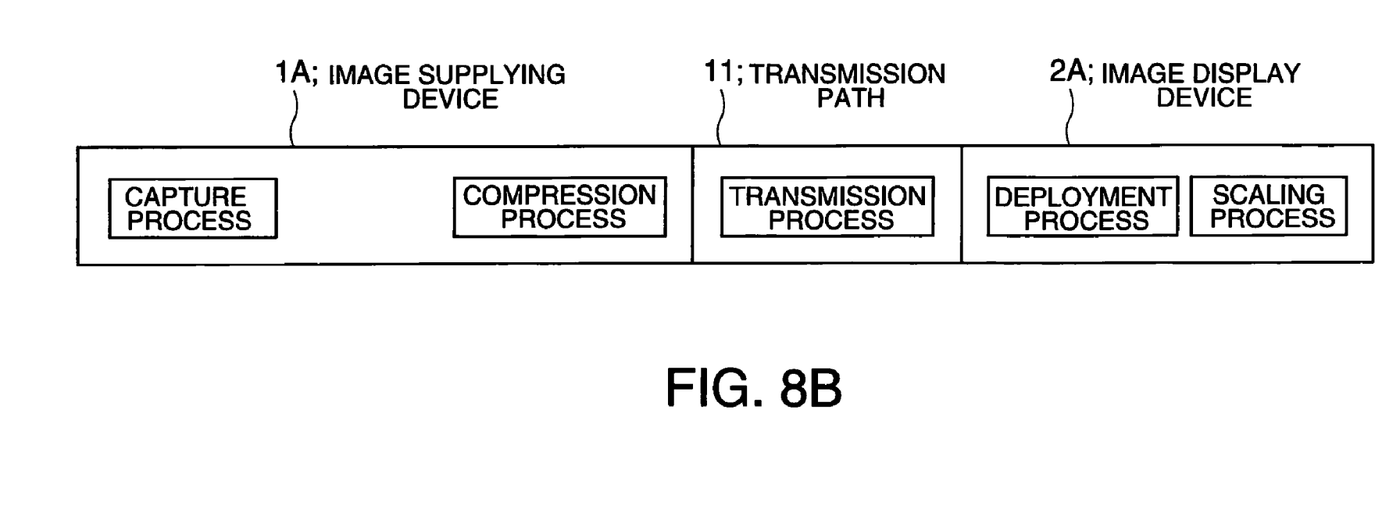
FIG. 8B is a schematic view showing various types of processes according to the second embodiment.

The image supplying device 1A according to the second embodiment performs the process of determining the image transmission method (step S3') in the sequence shown in FIGS. 6 and 7.

That is, the image supplying device 1A acquires the resolution (panel resolution and maximum resolution) of the image display device 2A from the capability received from the image display device 2A as the step S2 and acquires the resolution (self resolution) supported by the image supplying device (step S3a). Thereafter, it is determined whether the panel resolution and the maximum resolution are supported by the image supplying device and the self resolution is supported by the image display device 2A (step S3b).

Here, since the image supplying device 1A cannot provide the image data having the resolution which can be treated by the image display device 2A if the determination of the step S3b is "No", the process of determining the image transmission method (step S3') is finished. If the determination of the step S3b is "Yes", it is determined whether the resolution (self resolution) supported by the image supplying device is larger than the maximum resolution of the image display device 2A (step S3c).

If the determination of the step S3c is "Yes", the image supplying device 1A compares the panel resolution of the image display device 2A with the maximum resolution and determines whether the maximum resolution is larger than the panel resolution (step S3d). If the determination is "Yes", the image display device 2A is determined as an executer of the scaling process of the image data (step S3e). In contrast, if the determination is "No", the image data is subjected to the scaling process with the maximum resolution of the image display device 2A (step S3f).

That is, the image supplying device 1A executes the scaling process only when the panel resolution of the image display device 2A is equal to or less than the maximum resolution.

Meanwhile, if the determination of the step S3c is "No", the image supplying device 1A determines whether the self resolution is larger than the maximum resolution of the image display device 2A (step S3g) If this determination is "Yes", it is determined whether the maximum resolution is larger than the panel resolution (step S3h). If this determination is "Yes", the image display device 2A is determined as the executer of the scaling process of the image data (step S3i). In contrast, if this determination is "No", the image data is subjected to the scaling process with the maximum resolution of the image display device 2A (step S3j).

If the determination of the step S3g is "No", the image supplying device 1A determines whether the maximum resolution is larger than the panel resolution (step S3k). If this determination is "Yes", it is determined whether the self resolution is larger than the panel resolution of the image display device 2A (step S3m) If this determination is "Yes", the image display device 2A is determined as the executer of the scaling process of the image data (step S3n). In contrast, if this determination is "No", it is determined that the scaling process of the image data is not executed (step S3p).

If the determination of the step S3k is "No", the image supplying device 1A determines that the scaling process of the image data is not executed (step S3q).

When the scaling process of the image data is determined by a series of processes including the steps S3a to S3q, the image supplying device 1A measures the scaling processing speed when the scaling process is performed by the image supplying device (step S3r).

The image supplying device 1A measures the compression process speed when the image data, which is subjected to the scaling process, is subjected to the compression process by the compression method supported by the image supplying device (step S3s). The communication speed measurement data is transmitted to the image display device 2A so as to measure the transmission processing speed of the image data which is subjected to the compression process (step S3t). An optimal transmission method of the image data, which is subjected to the compression process, is determined by referring to the correspondence table on the basis of the scaling processing speed, the compression processing speed and the transmission processing speed (step S3u).

Then, the image supplying device 1A initializes the frame buffer necessary for the determined optimal transmission method (step S3v).

If it is determined that the image supplying device 1A performs the scaling process by the above-described process, as shown in FIG. 8A, the image supplying device 1A performs the capture process, the scaling process and the compression process of the image data, the transmission path 11 performs the transmission process of the image data compressed by the image supplying device 1A, and the image display device 2A performs the deployment process of the image data compressed by the image supplying device 1A.

If it is determined that the image supplying device 1A does not perform the scaling process, as shown in FIG. 8B, the image supplying device 1A performs the capture process and the compression process of the image data, the transmission path 11 performs the transmission process of the image data compressed by the image supplying device 1A, and the image display device 2A performs the scaling process in addition to the deployment of the process of the image data compressed by the image supplying device 1A.

According to the second embodiment, the image supplying device 1A can select and determine the optimal communication method according to the contents of the capability of the image display device 2A, that is, can flexibly determine the optimal communication method according to the image display device 2A and transmit the image data to the image display device 2A.

The invention claimed is:

1. A method of determining an optimal image transmission method when image data is transmitted from an image supplying device to an image display device, the method comprising:
  a capability request step of transmitting a capability request command from the image supplying device to the image display device;
  a capability request command response step of transmitting capability information from the image display device to the image supplying device according to the capability request command, the capability information including resolution of the image display device; and
  an image transmission method determining step of determining, before the image data is transmitted after a transmission path from the image supplying device to the image display device is established, an image transmission method on the basis of correspondence table, which is previously prepared, such that the optimal image transmission method according to at least one of transmission path information and capability of the image display device acquired by the image supplying device is derived, wherein the image transmission method determining step further includes a scaling determining step of determining, based on the resolution of the image display device, which of the image supplying device and the image display device executes scaling of the image data for decreasing the data amount of the image data by reducing the image.

2. The method according to claim 1, comprising:
a connection request step of transmitting the connection request command from the image supplying device to the image display device;
an image configuration data transmission step of transmitting data, which can define at least resolution or a pixel format, from the image supplying device to the image display device as image configuration data of an image to be transmitted;
a state inquiry step of transmitting a state inquiry command from the image supplying device to the image display device;
a state inquiry command response step of responding to the state inquiry command; and
an image data transmission step of transmitting the image data from the image supplying device to the image display device by the method determined by the image transmission method determining step.

3. The method according to claim 2, wherein the image transmission method determining step includes:
a compression method determining step of determining a compression method of the image data in a selectable range.

4. The method according to claim 3, wherein, if the image configuration data is included in the connection request command, the image configuration data transmission is executed in the same sequence.

5. The method according to claim 2, wherein, in the capability request command, among capability IDs which are determined in each of contents of the capability, the image supplying device requests only a capability ID related to a valid capability acquired by the image supplying device to the image display device.

6. The method according to claim 1, comprising:
a communication speed measurement data transmission step of transmitting communication speed measurement data from the image supplying device to the image display device;
an image transmission method determining step of measuring a communication speed on the basis of the communication speed measurement data and determining an optimal transmission method of image data;
a connection request step of transmitting the connection request command from the image supplying device to the image display device;
a state inquiry step of transmitting a state inquiry command from the image supplying device to the image display device;
a state inquiry command response step of responding to the state inquiry command; and
an image data transmission step of transmitting the image data from the image supplying device to the image display device by the method determined by the image transmission method determining step.

7. An image supplying system for supplying image data from an image supplying device to an image display device through a transmission path, wherein:
the image supplying device comprises:
a capability request unit which transmits a capability request command to the image display device;
an image transmission method determination unit which determines an optimal transmission method of the image data on the basis of at least one of transmission path information and capability information obtained from the image display device;
a connection request unit which transmits a connection request command to the image display device;
an image configuration data transmission unit which transmits image configuration data, which can define at least resolution or a pixel format, to the image display device as image configuration data of an image to be transmitted;
a state inquiry unit which transmits a state inquiry command to the image display device; and
an image data transmission unit which transmits the image data from the image supplying device to the image display device by the method based on the determination of the image transmission method determination unit, and
the image display device comprises:
a capability information provision unit which provides capability information according to the capability request command, the capability information including resolution of the image display device; and
a state inquiry command response unit which responds to the state inquiry command;
wherein the image transmission method determination unit further determines the optimal transmission method of the image data by determining, based on the resolution of the image display device, which of the image supplying device and the image display device executes scaling of the image data for decreasing the data amount of the image data by reducing the image.

8. An image supplying system for supplying image data from an image supplying device to an image display device through a transmission path, wherein:
the image supplying device comprises:
a capability request unit which transmits a capability request command to the image display device;
a communication speed measurement data transmission unit which transmits communication speed measurement data to the image display device;
an image transmission method determination unit which determines an optimal transmission method of the image data on the basis of the communication speed measured based on at least one of the communication speed measurement data and capability information obtained from the image display device;
a connection request unit which transmits a connection request command to the image display device;
a state inquiry unit which transmits a state inquiry command to the image display device; and
an image data transmission unit which transmits the image data from the image supplying device to the image display device by the method based on the determination of the image transmission method determination unit, and the image display device comprises:
- a capability information provision unit which provides capability information according to the capability request command, the capability information including resolution of the image display device; and
- a state inquiry command response unit which responds to the state inquiry command;

wherein the image transmission method determination unit further determines the optimal transmission method of the image data by determining, based on the resolution of the image display device, which of the image supplying device and the image display device executes scaling of the image data for decreasing the data amount of the image data by reducing the image.

9. An image supplying device for supplying image data to an image display device through a transmission path, the device comprising:

a capability request unit which:
- transmits a capability request command to the image display device, and
- receives capability information from the image display device according to the capability request command, the capability information including resolution of the image display device;

an image transmission method determination unit which determines a transmission method of the image data on the basis of at least one of transmission path information and capability information obtained from the image display device;

a connection request unit which transmits a connection request command to the image display device;

an image configuration data transmission unit which transmits image configuration data, which can define at least resolution or a pixel format, to the image display device as image configuration data of an image to be transmitted;

a state inquiry unit which transmits a state inquiry command to the image display device; and an image data transmission unit which transmits the image data from the image supplying device to the image display device by the method based on the determination of the image transmission method determination unit;

wherein the image transmission method determination unit further determines the optimal transmission method of the image data by determining, based on the resolution of the image display device, which of the image supplying device and the image display device executes scaling of the image data for decreasing the data amount of the image data by reducing the image.

10. An image supplying device for supplying image data to an image display device through a transmission path, the device comprising:

a capability request unit which:
- transmits a capability request command to the image display device, and
- receives capability information from the image display device according to the capability request command, the capability information including resolution of the image display device;

a communication speed measurement data transmission unit which transmits communication speed measurement data to the image display device;

an image transmission method determination unit which determines an optimal transmission method of the image data on the basis of the communication speed measured based on at least one of the communication speed measurement data and capability information obtained from the image display device;

a connection request unit which transmits a connection request command to the image display device;

a state inquiry unit which transmits a state inquiry command to the image display device; and an image data transmission unit which transmits the image data from the image supplying device to the image display device by the method based on the determination of the image transmission method determination unit;

wherein the image transmission method determination unit further determines the optimal transmission method of the image data by determining, based on the resolution of the image display device, which of the image supplying device and the image display device executes scaling of the image data for decreasing the data amount of the image data by reducing the image.

11. An image display device for receiving image data from an image supplying device through a transmission path, the device comprising:

a capability information provision unit which provides capability information according to a capability request command received from the image supplying device, the capability information including resolution of the image display device for determining an optimal transmission method of the image data by determining, based on the resolution of the image display device, which of the image supplying device and the image display device executes scaling of the image data for decreasing the data amount of the image data by reducing the image; and a state inquiry command response unit which responds to a state inquiry command received from the image supplying device.

12. The image display device according to claim 11, wherein the image display device is a projector.

13. A non-transitory computer-readable storage medium on which a program is recorded in such a manner as to be readable by a computer, the program comprising:
- a capability request step of transmitting a capability request command from an image supplying device to an image display device;
- a capability request command response step of transmitting capability information from the image display device to the image supplying device according to the capability request command, the capability information including resolution of the image display device;
- an image transmission method determining step of determining the image transmission method, the image transmission method determining step including a scaling determining step of determining, based on the resolution of the image display device, which of the image supplying device and the image display device executes scaling of the image data for decreasing the data amount of the image data by reducing the image;
- a connection request step of transmitting connection request command from the image supplying device to the image display device;
- an image configuration data transmission step of transmitting data, which can define at least resolution or a pixel format, from the image supplying device to the image display device as image configuration data of an image to be transmitted;
- a state inquiry step of transmitting a state inquiry command from the image supplying device to the image display device;

a state inquiry command response step of responding to the state inquiry command; and an image data transmission step of transmitting the image data from the image supplying device to the image display device by the method determined by the image transmission method determining step.

14. A non-transitory computer-readable storage medium on which a program is recorded in such a manner as to be readable by a computer, the program comprising:

a capability request step of transmitting a capability request command from an image supplying device to an image display device;

a capability request command response step of transmitting capability information from the image display device to the image supplying device according to the capability request command, the capability information including resolution of the image display device;

a communication speed measurement data transmission step of transmitting communication speed measurement data from the image supplying device to the image display device;

an image transmission method determining step of measuring a communication speed on the basis of the communication speed measurement data and determining an optimal transmission method of image data, the image transmission method determining step including a scaling determining step of determining, based on the resolution of the image display device, which of the image supplying device and the image display device executes scaling of the image data for decreasing the data amount of the image data by reducing the image;

a connection request step of transmitting the connection request command from the image supplying device to the image display device;

a state inquiry step of transmitting a state inquiry command from the image supplying device to the image display device;

a state inquiry command response step of responding to the state inquiry command; and an image data transmission step of transmitting the image data from the image supplying device to the image display device by the method determined by the image transmission method determining step.

* * * * *